UNITED STATES PATENT OFFICE.

FENWICK R. LOVELACE, HAROLD S. LOVELACE, AND ANTON M. HOLM, OF ROCKFORD, ILLINOIS; SAID HOLM ASSIGNOR TO SAID FENWICK R. LOVELACE AND SAID HAROLD S. LOVELACE.

BREAD-MAKING.

1,258,793.

Specification of Letters Patent. Patented Mar. 12, 1918.

No Drawing. Application filed March 17, 1917. Serial No. 155,570.

*To all whom it may concern:*

Be it known that we, FENWICK R. LOVELACE, HAROLD S. LOVELACE, citizens of the United States, and ANTON M. HOLM, a subject of the King of Denmark, residing at Rockford, in the county of Winnebago and State of Illinois, have invented certain new and useful Improvements in Bread-Making, of which the following is a specification.

This invention pertains to bread and bread making, and has more particular reference to the method of preparing the dough, especially for the purpose of commercial baking where bread is baked in large quantities.

Commercial bakers endeavor to produce an appetizing and nutritious loaf of bread at the least expenditure of money and labor. In order to satisfy the buyer the bread must possess well recognized characteristics with regard to flavor, lightness, color, grain and texture of the crumb and crust, and preserving qualities. These must be produced in the bread at the least expenditure in order that a reasonable profit might be made in the view of the always present competition. Certain ingredients or their equivalents have, therefore, been necessary to prepare and bake bread in a commercially successful manner, but it is found, due to increasing costs of such ingredients that the percentage of profit in bread making is materially reduced and that in the exigency various substitutes and chemicals have been employed in place of certain ingredients in the attempt to produce at a low cost bread which has the apparent desirable characteristics and qualities. This practice, however, is harmful and does not give bread having the desired nutritive values.

Because of these conditions, we have devised an improved and novel method of preparing and making bread whereby bread in large quantities may be produced not only at a materially less cost than is possible under the methods now commonly practised, but in such manner that the bread possesses more desirable and valuable characteristics than when made according to the old methods.

By preparing the dough according to our new process, certain ingredients may be omitted without necessitating additional ingredients or increasing the cost in any way, and the resultant loaf has a better and more natural flavor, has a finer crust and crumb texture, remains fresh in the loaf considerably longer, and is a better toasting bread than that made according to old methods.

In order that our new process may be more readily understood and appreciated by comparison, we will briefly describe the method of making bread now generally practised by commercial bakers. In treating this method and also in describing our new process, we will take a given example of preparing a certain quantity of bread, but it should be understood that the present invention is in no way limited to this quantity or to the specific amount of ingredients employed as it serves merely for purpose of illustrating the relative proportion of the several ingredients and the method of handling and treating the same. Since wheat flour is best suited to bread making it is most generally used and we have chosen this variety of flour in illustrating our improvement. The flour most desirable and employed by reputable bakers is a milling product known as first patent flour. From 2 barrels of this flour approximately 420 22-ounce loaves of bread may be made. For convenience in distinguishing between the two methods we will term that now practised as the old method and our improved process as the new method.

According to the old method, the quantity of bread which 2 barrels of flour will produce is made approximately as follows: In making this bread, there is mixed with 2 barrels of flour 12 baker's pails, each containing 12 quarts, or 144 quarts in all of luke warm water, that is, water between 84° and 90° F., 10 pounds of sugar, 5 pounds of salt, 5 pounds of lard or shortening, and 6 pounds of yeast. These are suitably mixed together and kneaded by mechanical means, producing a straight dough or what is commonly called an off-hand dough. In preparing a straight dough in which all the materials or ingredients are mixed at above one time, the bread will rise in a shorter time than is required with a sponge dough, and the crumb produced is of a finer texture and will not crumble as easily as bread produced from a sponge dough. The yeast, of course, serves its ordinary function of producing fermentation and the salt acts as a fermentation regulator and adds somewhat to the flavor. By varying the amount of salt, the bread will rise in longer or shorter periods, and by employing this amount of salt the time required is about 5 hours, thereby producing what is known as a five-hour straight dough. The shortening gives in part the necessary moisture and fat properties which favor the proper crust and crumb texture and preserve to a certain degree the bread in a fresh state. The sugar gives color, moisture and flavor, its most important function being that of producing a rich golden brown color quite necessary for commercial bread. Bread prepared from dough according to this method and properly baked possesses the ordinary requisites and serves very well the ordinary demand. The crust of such bread, however, becomes hard when it is cooled and increases in hardness as the bread becomes older, and, in fact, about 48 hours from the time it is baked it is considered stale bread.

Considering now the new method, an example of preparing and baking a quantity of bread similar to that described under the old method will be illustrated. The dough, while prepared differently from the old method, might still be termed a straight dough. Of the given quantity of flour, viz: 2 barrels or approximately 392 pounds and of the 12 pails or 144 quarts of water, a relatively small portion of each is mixed together separate from the major portion. This separate mixture contains 14 pounds of flour and 2 pails or 24 quarts of water. To this mixture is also added $5\frac{1}{2}$ pounds of salt, although this may if desired be added later to the entire mixture. The admixture of this small portion of the given amount of flour with the small portion of water is, however, made peculiar by reason of the fact that the water is added to the mixture at a relatively high temperature, that is, in proximity to the boiling point, and the dry flour is thereby scalded directly. In general practice, it is found that the best results are obtained by heating this portion of the water to about 200° F., although water in the vicinity of 212° or the boiling point might be used, but not with as satisfactory results. The water thus added, when thoroughly mixed with the flour has a peculiar effect thereon, in that it brings out the gluten and dextrin of the flour and produces a mixture of a mash consistency having a gelatinous resemblance in which the tenacious and gummy appearance of the gluten is plainly present, and in fact, appears to constitute the major portion of the mixture. To this mixture is then added the remainder of the given amount of flour and cold water, that is, 120 quarts of water at from 56° to 60° F. and 378 pounds of flour, and $5\frac{1}{4}$ pounds of yeast. This amount of yeast is not essential, however, as it is merely determinative of the rising of the dough and by varying the amount a quicker or slower rising dough may be produced. These materials are then mixed together and kneaded in the ordinary manner by a mechanical kneading device for about from 15 to 20 minutes. In the present instance the dough is set in troughs, and being a five-hour dough, is punched at the end of the third and fourth hours and again about 15 minutes before the fifth hour. The dough is then cut and prepared for the pans and is baked in the ordinary way.

Before considering the characteristics of the bread produced by the new method, it will be particularly noted that the sugar and shortening employed in the old method have been entirely omitted in the new method and this saving of materials without any additional cost effects a considerable reduction in the cost of producing bread. It will also be noted that the several steps follow one another directly without delay or hindrance of any nature or the requirement of any special apparatus or machinery other than the ordinary mechanical bread mixing machinery in common use. The given small portion of dry flour is scalded directly by the small portion of water to produce a mixture that will have present a proper amount of gluten and dextrin to afterward give to the dough the necessary properties for producing commercially salable bread which will retain its freshness and moisture for a longer period than the bread now made according to common processes. The new method bread in the first place has a rich golden brown color in every respect equal to that of the old method bread, and it might be here mentioned that if bread were made in commercial quantities according to the old method and the sugar and shortening were omitted the resultant product would not be fit for sale as it would have an insipid taste and practically no color and would not retain its freshness and moisture to the extent desired. The flavor of the new bread is more desirable in that it possesses a more distinct wheat taste with the proper sweetness. By chemical analysis the new method bread contains 38.06 per cent. of moisture as against 38.94 per cent. in the old method bread and contains 1.238 per cent. of fat as against 1.079 per cent. under the old method. It is thus seen that the new bread shortly after being baked contains less moisture and more fat than the old method bread. This in connection with the texture of the crust and crumb or interior of the bread make the same peculiarly capable of preserving its moisture and freshness, and when wrapped and sealed in waxed or paraffin paper as is the ordinary practice, is practically equal to and may be sold as fresh bread 4 or 5 days after baking. The texture of the crumb and crust is fine, the pores of the crumb being uniform and small and the crust being somewhat soft instead of hard and brittle as in the old method. In fact, the crust softens somewhat after being removed from the oven about 5 minutes and stays soft although it possesses a somewhat flinty character, so that it is more palatable and edible than the old method crust which is often wasted and thrown away for the very reason of its hardness. Furthermore, the fineness of the grain texture of the crumb makes the bread better adapted for toasting as it will not crumble as readily as does the old method bread. These advantages and very desirable characteristics, we attribute to the novel method or process by which the dough is prepared and we have found that this method enables us to produce a better and more commercially successful bread at a more economical cost of production than is possible under the old method. It will be noted that while omitting two important ingredients, absolutely necessary to produce commercially successful bread under the old method, we obtain material advantages and new results, which effect is attained by the peculiar process of preparing the dough. In this connection, attention is called to the fact that a relatively small portion of the flour and liquid is mixed together separately with the liquid at a relatively high temperature, that is, in proximity to the boiling point and is literally scalded. The chemical action or dissimilating effect of this hot liquid upon the flour and the effect of the glutinous matter and dextrin thus brought out upon the admixture of this small portion to the major portion of the flour and liquid gives a bread capable of being more economically produced and possessed of more superior and desirable characteristics than may be produced when dough is prepared according to the old method.

Having in mind our improved method just described, we wish to state briefly some of its practical and commercial advantages. In commercial bakeries where large quantities of bread are baked each day the high and increasing costs of ingredients, labor and equipment have compelled bakers to resort to stringent efforts in their methods in order that commercially salable and nutritious bread might be made, at a profit. The elements of time, labor, equipment and materials are, therefore, of utmost importance, and a saving in any one of these may mean all the difference between success and failure of a baking establishment. Nevertheless, a baker, in order to maintain a going business, must produce bread having desirable characteristics with regard to flavor, color, moisture, texture of crust and crumb, etc. These are obtained in a most satisfactory way by the practice of our improved method of making bread, and moreover, a very material saving in the cost of ingredients is effected, as compared with the present day methods. In obsolete methods in which flour is gelatinized in a different way from that practised by applicants, the various steps and operations and the time and equipment required are inimical to practical and successful baking under present day conditions, saying little as to whether the bread produced thereby would be commercially salable according to the standards and requirements of the day. The importance in national economy of the cost of producing bread is emphasized by the present laws which forbid bakers to take back stale bread from the distributers. This means that all bread must be sold or become a loss to the dealer or producer, hence the importance of our new method will be seen when it is observed that bread produced thereby is of the best quality, maintains its freshness longer and is less liable to become a loss than bread made according to any previous method.

We claim:

1. The method of preparing dough for commercial baking which consists in directly scalding a relatively small portion of dry flour with a relatively small quantity of hot water, and of the admixture to this scalded flour of the balance of the total water, cold, and of the balance of the total flour, and of providing for the proper fermentation of the dough.

2. The method of preparing dough for the commercial baking of wheaten bread, which consists in gelatinizing a portion of the dry flour directly by the admixture thereto of scalding water, this gelatinized mixture constituting a relatively small portion of the total flour and water employed in preparing a given amount of dough, and in the direct admixture to said hot gelatinized mixture of the balance or greater portion of the water, cold, and of the balance of the total amount of flour, and of thoroughly mixing or kneading this mixture and of causing the requisite fermentation or rising of the dough.

3. The method of preparing dough for making commercial wheaten bread without the use of sugar and shortening, which consists in directly scalding approximately one-twenty-eighth of the total flour, dry, with approximately one-sixth of the total water, and of the direct admixture to said scalded hot flour of the remaining five-sixths of the water, cold, and of the twenty-seven-twenty-eighths of the flour, salt and yeast being added in the process in proper proportions.

4. The method of preparing dough for making bread which consists in the mixture of ingredients in relative proportions substantially as follows: flour 14 pounds, water 24 quarts preferably at a temperature of approximately 200° F., these being mixed together forming a small separate portion of the dough, and in mixing with said portion 378 pounds of flour, (that is, 2 barrels less said 14 pounds), 120 quarts of water, 5½ pounds of yeast and 5½ pounds of salt, substantially as described.

FENWICK R. LOVELACE.
HAROLD S. LOVELACE.
ANTON M. HOLM.